Patented Nov. 22, 1927.

1,650,080

UNITED STATES PATENT OFFICE.

VICTOR LEFEBURE, OF HAMPSTEAD, LONDON, ENGLAND.

MANUFACTURE OF TILE.

No drawing. Application filed March 4, 1927, Serial No. 172,919, and in Great Britain December 7, 1925.

This invention relates to processes for the manufacture of decorated tiles, and has for its object the manufacture of a decorative tile or sheet by covering asbestos cement or other rigid or semi-rigid sheets with a layer of coloured, mottled or designed material in which the binding and protective agent is either a silicate or mixed silicates or free silica, or a mixture of all of these, hereafter referred to as silicate constituent, without employing in the process the very high temperatures which are employed in the manufacture of the well-known ceramic tiles and slabs: or I may manufacture a tile or slab without a special backing in a similar manner as hereinafter explained. The tiles or slabs may be simple flat tiles, or they may be corrugated or otherwise moulded.

In the manufacture of ceramic tiles and slabs, furnace temperatures reaching as high as 1000° C. and higher are required, which render it practically impossible to obtain large sheets owing to the warping and shrinkage, etc., which is inherent in the use of such temperatures with such materials. Also, these firing methods at high temperature involve long periods of time, are relatively costly and render it difficult if not impossible to manufacture economically small quantities of specific types of tiles or slabs.

It is known that certain silicates and certain oxides and salts exist in a form which may be called syrupy or plastic, which form is usually attributed to their colloidal nature. Such chemical compounds are the alkaline silicates, silicic acid, a number of oxides or hydroxides, such as zinc oxide, iron oxide, tin oxide, tungsten oxide, phosphoric acid and certain salts, such as zinc chloride and ferric phosphate; many others are mentioned in the literature.

An insoluble reaction product is obtained from the said silicate constituents (syrupy alkaline silicates, colloidal silicic acid and silica itself, preferably the amorphous variety) with various oxides and salts, and either the silicate or the oxide and salts or both may be in the plastic form. In many of these cases the equilibrium of the alkaline silicate or silicic acid is destroyed, throwing out silica. In both types of reaction an insoluble binding agent results consisting of the insoluble silicate or the free silica thrown out, or a mixture of both.

I conduct this chemical reaction so as to form insoluble silicate and/or silica in a hard shaped mass, and I may manufacture a decorative tile or slab without any rigid backing by sheeting or moulding the said composition itself of a sufficient thickness to give it sufficient mechanical strength, or I can join thinner sheets thereof to a rigid backing, making a composite tile or slab. The said thinner sheets can be joined to one face of the backing or to both faces so as to envelop it completely, or substantially so.

For example, syrupy or plastic sodium silicate is intimately mixed with zinc oxide to form a plastic mass which can be sheeted or shaped. This is heated to about 150° C. for less than a quarter-of-an-hour and yields a very hard coherent mass which perfectly resists the action of water, has a very high resistance to alkaline corrosive agents, and a fairly high resistance to acid corrosive agents. At lower temperatures longer times are required to produce the change which develops these advantageous properties. If fillers, such as silica, asbestos, various inorganic and organic colours, are added to the plastic mass prior to heating, the insoluble mass still results after heating being modified in properties according to the nature of the filler. According to this invention, I employ essentially the silicate constituent, such as a silicate, and, on the other hand, the appropriate oxide or salt to form the insoluble reaction product, and I employ one or both of these constituents in the plastic form, so that prior to the actual reaction, I form a homogeneous mass containing the two or more reactants and any fillers. Such a mass is suitable for sheeting or shaping prior to the application of the necessary heat with or without pressure, which converts the relatively soluble unchanged mass into the insoluble changed mass. Further I operate at temperatures lower than 350° C.

In the present application I claim the process and product when the silicate constituents are in the plastic form and combined with oxides and salts. The said oxides or salts may, if desired, also be plastic. I do not claim in this specification the process and products when the oxide or salt element is plastic and the silicate constituent not plastic.

Apart from the use of such fillers as colours for decoration and fibrous asbestos for strength in accordance with the practice of the moulding art, I employ two special types of fillers for two special purposes. First, in order to combine with any uncombined water remaining in the finished mass, I may add chemicals capable of combining with or taking up such water, for example, Portland cement or zinc or magnesium chloride in the presence of their respective oxides. Secondly, to neutralize any unfixed alkali such as might be present in a mix containing alkaline silicate and zinc oxide, I add a body which I have found binds the free alkali at the temperature used, such as calcium fluoride, magnesium oxide, aluminum hydroxide, or oxide, or a soluble silicofluoride such as zinc or magnesium silicofluoride, or the double salt.

The following are further examples of the manner in which my invention is carried out:

Example I.

I may employ the plastic constituent, as, for example, sodium silicate, as the binding agent prior to heating, and add the necessary fillers, such as zinc oxide and asbestos, on a suitable mixing machine, such as a doughmill. These are worked up to give a plastic mass which can be sheeted between calender rolls. This is a most important application of the plastic mass. During the milling and sheeting process, different markings imitating, for example, natural stone, can be introduced by employing different plastic masses and partially mixing them. The calendered sheet is then cut out to the requisite size and pressed on to a rigid backing, such as asbestos cement, between heated platens. To ensure the most perfect adhesion between the decorative sheet and the rigid backing it is advisable to employ a junction which can be of two types. First, it can be a mixture of sodium silicate and zinc oxide, with fillers such as sand, painted or sprayed on to the asbestos cement, or secondly, a mixture of synthetic resin, and mineral fillers similarly applied. After a suitable period at a suitable temperature, which in the above case would be from ten to fifteen minutes at about 150° C., the sheet would be removed from the press as a very strong, hard, smooth-surfaced, resistant composite layer.

Example II.

I can employ the plastic ingredient as a thinner syrup adding the necessary reagent and fillers to make a syrup or cream which can be sprayed or painted on to the asbestos cement or other rigid backing, which composite layer is then subjected to the necessary heat with or without pressure applied in autoclaves or in presses as above. The same change occurs leaving a strong composite layer with a hard smooth resistant surface.

Example III.

A composition can be applied to the abestos cement or other rigid layer by using the plastic ingredient in a state sufficiently dry so that it is a powder at low temperatures, such as room temperatures, although it is more plastic at higher temperatures. This powder is intimately mixed with the necessary reagents and fillers and moulded in a press on to the surface of the asbestos cement or other rigid backing. The mixture flows together in the same manner as moulding powders of the synthetic resin type giving the same type of composite layer as in the two above-mentioned processes. A modification of this third method is to add the reagents and the filling materials to the plastic constituent before drying it to the powder stage. The mass thus mixed in the more fluid state is dried at a low temperature to the same state as before mentioned, that is, sufficiently to produce a dry powder at room temperatures but not sufficiently to carry out the reaction. This powder is then applied as above.

The following are examples of mixtures yielding the plastic mass and the junction materials according to this invention:

Plastic mass.

| | |
|---|---|
| Alkaline silicate | 12 lbs. |
| Zinc oxide | 8 lbs. |
| Magnesium oxide | 1 lb. 8 ozs. |
| Asbestos | 5 lbs. |
| Red oxide | 1 lb. |

Silicate junction.

| | |
|---|---|
| Alkaline silicate | 12 lbs. |
| Zinc oxide | 8 lbs |
| Silica | 4 lbs. |
| Water | 6 lbs. |

Synthetic resin junction.

| | |
|---|---|
| Phenol formaldehyde resin | 5 lbs. |
| Zinc oxide | 5 lbs. |
| Silica | 2 lbs. |
| Methylated spirits | 1 gallon. |

By means of this invention I produce upon asbestos cement or other rigid backing or without such backing a decorative resistant layer in which the main binding and protective agent is a silicate or silica or both, which has a very smooth surface with the same resistance as the better grade contructional and decorative stones and at a very much lower cost of production.

What I claim and desire to secure by Letters Patent is:—

1. A tile produced at temperatures below 350° C. from a silicate constituent with fillers in the plastic form, and an oxide, in combination with a backing of asbestos cement, to which the tile is secured by a joining agent between the tile and the backing.

2. A tile produced at temperatures below 350° C. from a silicate constituent with fillers in the plastic form, and an oxide, in combination with a backing of asbestos cement, to which the tile is secured by a joining agent between the tile and the backing, said joining agent being constituted by a mixture of synthetic resin and mineral filler.

3. A method of producing tile which comprises mixing a silicate with fillers, and forming a plastic mass thereof, incorporating an oxide therein, providing a backing of asbestos, cement, uniting the backing to the tile constituents by means of a joining agent applied between the tile and the backing, and baking the whole at temperatures below 350° C.

In testimony whereof, I affix my signature.

VICTOR LEFEBURE.